US011065954B2

(12) United States Patent
 Koga et al.

(10) Patent No.: US 11,065,954 B2
(45) Date of Patent: Jul. 20, 2021

(54) FUEL FILL OPENING STRUCTURE FOR FUEL TANK

(71) Applicants: HONDA MOTOR CO., LTD., Tokyo (JP); Yachiyo Industry Co., Ltd., Saitama (JP)

(72) Inventors: Yuki Koga, Wako (JP); Kazunari Nakaya, Utsunomiya (JP); Masaki Komada, Inabe-gun (JP)

(73) Assignees: HONDA MOTOR CO., LTD., Tokyo (JP); Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 16/626,614

(22) PCT Filed: May 31, 2018

(86) PCT No.: PCT/JP2018/020970
§ 371 (c)(1),
(2) Date: Dec. 26, 2019

(87) PCT Pub. No.: WO2019/008959
PCT Pub. Date: Jan. 10, 2019

(65) Prior Publication Data
US 2020/0156465 A1 May 21, 2020

(30) Foreign Application Priority Data
Jul. 6, 2017 (JP) .............................. JP2017-132996

(51) Int. Cl.
*B60K 15/04* (2006.01)
(52) U.S. Cl.
CPC ...... *B60K 15/04* (2013.01); *B60K 2015/0461* (2013.01)

(58) Field of Classification Search
CPC ............ B60K 15/04; B60K 2015/0461; B60K 2015/0458; B60K 2015/048
(Continued)

(56) References Cited

U.S. PATENT DOCUMENTS 2,055,923 A * 9/1936 Buttner ................ B67D 1/1444
 141/1
3,979,010 A * 9/1976 Fiedler .................. B60K 15/04
 220/86.2
(Continued)

FOREIGN PATENT DOCUMENTS

JP 08-238944 9/1996
JP 3578421 10/2004
(Continued)

OTHER PUBLICATIONS

International Search Report and Written Opinion for International Application Serial No. PCT/JP2018/020970 dated Aug. 21, 2018, 7 pages.

*Primary Examiner* — Timothy L Maust
*Assistant Examiner* — James R Hakomaki
(74) *Attorney, Agent, or Firm* — Amin, Turocy & Watson, LLP

(57) ABSTRACT

A fuel fill opening structure for a fuel tank includes a fuel filler pipe, a fuel fill opening, and a flow guide. The flow guide includes a main guide wall which partitions a fuel introduction region inside the fuel filler pipe into an upper space communicating with a tank main body side and a lower space communicating with the fuel fill opening side, and a partition wall provided to be continuous with the main guide wall and configured to close a space between an upper surface side of the main guide wall and an inner surface of the fuel filler pipe. The main guide wall includes a bent inclined part that is bent and inclined downward from a middle portion in running from the fuel fill opening side (Continued)

toward the tank main body side. The bent inclined part has a shape in which a width thereof becomes smaller when viewed from above as it inclines downward.

4 Claims, 6 Drawing Sheets

(58) Field of Classification Search
USPC .................................. 141/286, 312, 392
See application file for complete search history.

(56) References Cited

U.S. PATENT DOCUMENTS

| | | | | |
|---|---|---|---|---|
| 4,040,458 A * | 8/1977 | Hansel | ..................... | B67D 7/54 141/392 |
| 4,204,563 A * | 5/1980 | Pyle | ..................... | B67D 7/42 141/1 |
| 4,327,783 A * | 5/1982 | Kanno | ..................... | B60K 15/04 141/349 |
| 5,752,553 A * | 5/1998 | Kmiecik | ..................... | B60K 15/04 141/286 |
| 5,860,460 A | 1/1999 | Hidano et al. | | |
| 6,405,767 B1 * | 6/2002 | Marsala | ..................... | B60K 15/04 141/286 |
| 6,523,582 B2 * | 2/2003 | Furuta | ..................... | B60K 15/04 141/286 |
| 6,546,972 B1 * | 4/2003 | Foltz | ..................... | B60K 15/04 141/301 |
| 6,705,481 B2 * | 3/2004 | Temmesfeld | ..................... | B60K 15/0406 141/350 |
| 8,714,213 B2 * | 5/2014 | Girgenrath | ..................... | B60K 15/04 141/350 |
| 9,216,891 B2 * | 12/2015 | Chretien | ..................... | B60K 15/04 |
| 9,731,596 B1 * | 8/2017 | Labbe | ..................... | B60K 15/0406 |
| 10,800,648 B2 * | 10/2020 | Zitkovic | ..................... | B60K 15/04 |
| 2009/0014091 A1 * | 1/2009 | Kobayashi | ..................... | B60K 15/04 141/286 |
| 2009/0084464 A1 * | 4/2009 | Hagano | ..................... | B60K 15/04 141/312 |
| 2009/0218009 A1 | 9/2009 | Rongstock | | |
| 2014/0183192 A1 * | 7/2014 | Aitken | ..................... | B60K 15/04 220/86.2 |
| 2016/0075230 A1 * | 3/2016 | Goto | ..................... | B60K 15/04 220/86.2 |
| 2017/0190248 A1 * | 7/2017 | Kikuya | ..................... | B60K 15/04 |
| 2017/0232836 A1 * | 8/2017 | Kito | ..................... | B60K 15/04 220/86.2 |
| 2020/0047608 A1 * | 2/2020 | Dufendach | ..................... | B60K 15/03 |

FOREIGN PATENT DOCUMENTS

| | | |
|---|---|---|
| JP | 2014-189267 | 10/2014 |
| JP | 2015-227112 | 12/2015 |

* cited by examiner

FUEL FILL OPENING STRUCTURE FOR FUEL TANK

TECHNICAL FIELD

The present invention relates to a fuel fill opening structure for a fuel tank.

Priority is claimed on Japanese Patent Application No. 2017-132996, filed Jul. 6, 2017, the content of which is incorporated herein by reference.

BACKGROUND ART

As a fuel fill opening structure for a fuel tank mounted on a vehicle, one having a flow guide provided in the vicinity of a fuel fill opening in a fuel filler pipe and configured to guide a flow of fuel flowing from a nozzle part of a fuel filling gun has been proposed (for example, refer to Patent Literature 1).

In a fuel fill opening structure described in Patent Literature 1, a flow guide is configured so that fuel that has flowed in from a nozzle part of a fuel filling gun flows into a tank main body of a fuel tank while spirally swirling along an inner surface of a fuel filler pipe. A guide surface of the flow guide is provided to be inclined in vertical and lateral directions with respect to an axis of the fuel filler pipe.

One fuel fill opening structure described in Patent Literature 1 is formed so that the guide surface of the flow guide is formed to have substantially a U-shaped cross section that is open upward, and the cross section is inclined in vertical and lateral directions with respect to the axis of the fuel filler pipe.

Also, in another fuel fill opening structure described in Patent Literature 1, the flow guide is formed in a tapered cylindrical shape, and the cylindrical part is inclined in vertical and lateral directions with respect to an axis of the fuel filler pipe.

CITATION LIST

Patent Literature

[Patent Literature 1]
Japanese Patent No. 3578421

SUMMARY OF INVENTION

Technical Problem

In one fuel fill opening structure described in Patent Literature 1, since the guide surface of the flow guide is formed to have substantially a U-shaped cross section that is open upward, it is conceivable that there is a likelihood of fuel vaporized inside the fuel filler pipe or the fuel tank passing through an upper space of the guide surface of the flow guide and then being discharged from the fuel fill opening to the outside at the time of refueling using the fuel filling gun.

Also, in another fuel fill opening structure described in Patent Literature 1, since the flow guide is formed in a tapered cylindrical shape, a fuel flow port at a lower end of the flow guide is very narrow, and there is room for improvement in a refueling performance with respect to fuel.

An aspect according to the present invention has been made in consideration of such circumstances and an objective of the present invention is to provide a fuel fill opening structure for a fuel tank in which both inhibiting an outflow of evaporated fuel to the outside and improving a refueling performance at the time of refueling can be achieved.

Solution to Problem

The present invention employs the following configurations in order to solve the above-described problems.

(1) A fuel fill opening structure for a fuel tank according to one aspect of the present invention includes a fuel filler pipe which extends from a tank main body of a fuel tank, a fuel fill opening which is provided at an extension end of the fuel filler pipe and into which a nozzle part of a fuel filling gun is able to be inserted, and a flow guide provided in a fuel introduction region in a vicinity of the fuel fill opening inside the fuel filler pipe and configured to guide a flow of fuel supplied from the fuel filling gun, wherein the flow guide includes a main guide wall which partitions the fuel introduction region inside the fuel filler pipe into an upper space communicating with the tank main body side and a lower space communicating with the fuel fill opening side, and a partition wall provided to be continuous with the main guide wall and configured to close a space between an upper surface side of the main guide wall and an inner surface of the fuel filler pipe, the main guide wall includes a bent inclined part that is bent and inclined downward from a middle portion in running from the fuel fill opening side toward the tank main body side, and the bent inclined part has a shape in which a width thereof becomes smaller when viewed from above as it inclines downward and forms a flow port for the fuel.

According to the above-described aspect (1), when the nozzle part of the fuel filling gun is inserted into the fuel fill opening and fuel is supplied from the nozzle part, the fuel flows into the lower space of the fuel introduction region partitioned by the main guide wall of the flow guide. The fuel that has flowed into the lower space is supplied to the tank main body through a gap between the bent inclined part of the main guide wall and the inner surface of the fuel filler pipe. At this time, although evaporated fuel generated on the tank main body side with respect to the flow guide in the fuel filler pipe moves upward inside the fuel filler pipe, since a space between an upper surface side of the main guide wall of the flow guide and the inner surface of the fuel filler pipe is closed by the partition wall, and the bent inclined part is provided in the main guide wall, the evaporated fuel is prevented from moving upward along the outer surface of the bent inclined part and moving further in a direction of the fuel fill opening by the partition wall. Also, since the bent inclined part of the flow guide has a shape in which a width thereof becomes smaller when viewed from above as it inclines downward, a large gap between the bent inclined part and the inner surface of the fuel filler pipe is secured, and this allows fuel with a sufficient flow rate to flow into the tank main body side through the gap.

(2) In the aspect (1) described above, a communication part expanding the flow port may be further provided in the bent inclined part.

According to the aspect (2) described above, since the communication part is provided in the bent inclined part of the flow guide, a larger fuel flow port is secured, and fuel with a sufficient flow rate passes through the fuel flow port and flows into the tank main body side.

(3) In the aspect (1) or (2) described above, the main guide wall may be formed in a shape that causes a flow of fuel supplied from the fuel filling gun to swirl along the inner surface of the fuel filler pipe.

According to the aspect (3) described above, the fuel that has passed through the main guide wall of the flow guide flows into the tank main body while swirling along the inner surface of the fuel filler pipe. At this time, the fuel does not readily scatter in the fuel filler pipe, and as a result, evaporation of the fuel is inhibited.

(4) In the aspect (3) described above, the fuel filler pipe may include an inlet side extended part which extends to be inclined obliquely downward from the fuel fill opening, and a pipe bent part which is bent downward from the inlet side extended part toward the tank main body side, and the main guide wall may be configured so that an intersection point between a virtual line passing through an extension end of the bent inclined part and following a flow direction of fuel at the extension end, and the inner surface of the fuel filler pipe is positioned on the fuel fill opening side with respect to the pipe bent part.

According to the aspect (4) described above, the fuel that has passed through the bent inclined part of the flow guide starts swirling along the inner surface of the inlet side extended part before the fuel reaches the pipe bent part of the fuel filler pipe. Therefore, when the fuel reaches the pipe bent part of the fuel filler pipe, the fuel changes its direction toward the tank main body without abruptly colliding with the inner surface of the pipe bent wall. Accordingly, when this configuration is employed, generation of evaporated fuel in the fuel filler pipe can be further inhibited.

Advantageous Effects of Invention

According to the aspect of the present invention, since the space between the upper surface side of the main guide wall of the flow guide and the inner surface of the fuel filler pipe is closed by the partition wall, and the bent inclined part is provided in the main guide wall, an outflow of evaporated fuel to the outside from the fuel fill opening can be inhibited by cooperation of the bent inclined part of the flow guide and the partition wall. Also, in the case of the aspect according to the present invention, the bent inclined part has a shape in which a width thereof becomes smaller when viewed from above as it inclines downward. Therefore, a large gap between the bent inclined part and the inner surface of the fuel filler pipe can be secured, and fuel can be caused to smoothly flow into the tank main body side through the gap. Therefore, according to the aspect of the present invention, both inhibiting an outflow of evaporated fuel to the outside and improving a refueling performance at the time of refueling can be achieved.

DESCRIPTION OF EMBODIMENTS

Hereinafter, one embodiment of the present invention will be described on the basis of the drawings.

Figure 1:
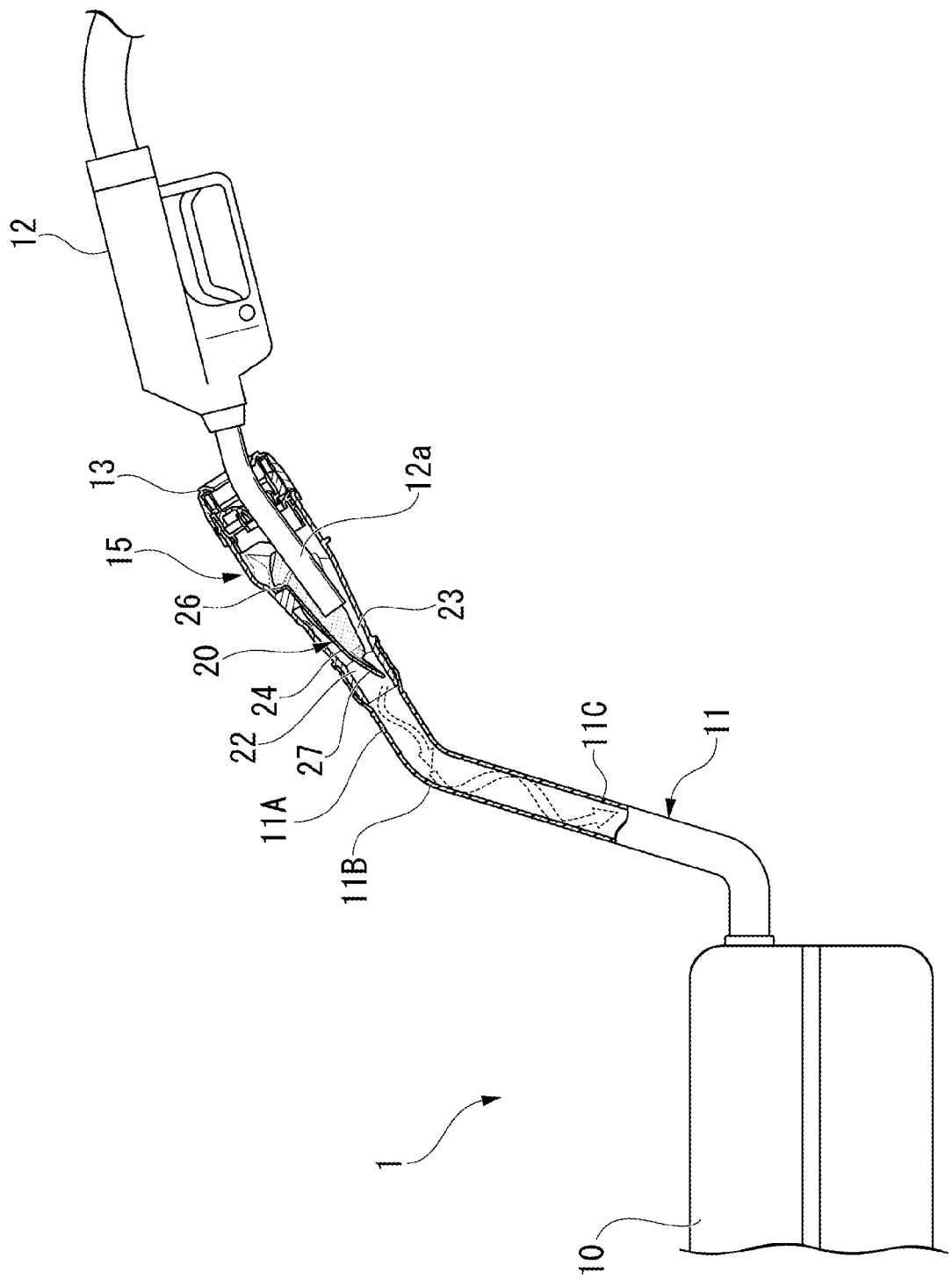
FIG. 1 is a cross-sectional view of a fuel tank according to one embodiment of the present invention.

FIG. 1 is a view illustrating a schematic cross section of a fuel tank 1 of a vehicle.

The fuel tank 1 includes a tank main body 10 which stores fuel, a fuel filler pipe 11 which extends obliquely upward from the tank main body 10, and a fuel fill opening 13 which is provided at an extension end of the fuel filler pipe 11 and into which a nozzle part 12a of a fuel filling gun 12 can be inserted. The fuel filler pipe 11 includes an inlet side extended part 11A which extends to be inclined obliquely downward from the fuel fill opening 13, a pipe bent part 11B which is bent downward from the inlet side extended part 11A toward the tank main body 10 side, and a base side extended part 11C which extends in a direction of the tank main body 10 from the pipe bent part 11B while being inclined downward at a steeper angle than the inlet side extended part 11A. The fuel fill opening structure 15 according to the present embodiment is provided in the fuel filler pipe 11.

Figure 2:
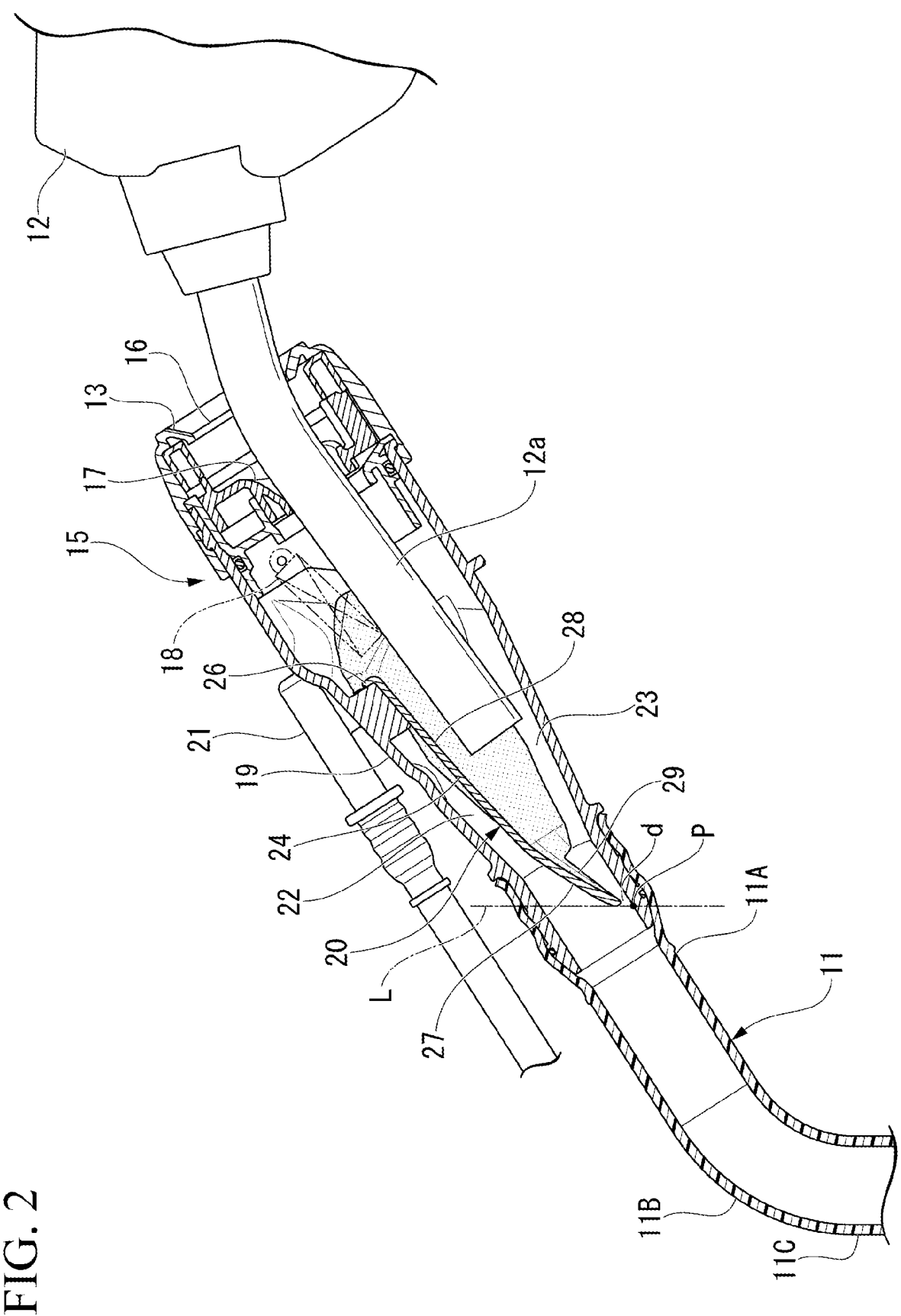
FIG. 2 is a longitudinal sectional view of a fuel fill opening structure according to one embodiment of the present invention.

FIG. 2 is an enlarged view illustrating the fuel fill opening structure 15 portion of the fuel filler pipe 11 in FIG. 1.

The fuel fill opening 13 includes a shutter valve 16 disposed at an outermost end portion and capable of opening and closing the fuel fill opening 13 laterally, a posture holding member 17 that holds a posture of the nozzle part 12a constant when the nozzle part 12a of the fuel filling gun 12 is inserted into the fuel fill opening 13, and an on-off valve 18 disposed on an inward side of the posture holding member 17 in the fuel filler pipe 11 and opening and closing the fuel fill opening 13. Both the shutter valve 16 and the on-off valve 18 are biased in a direction to close the fuel fill opening 13 by a biasing member (not illustrated), and the fuel fill opening 13 is opened when it is pressed by the nozzle part 12a of the fuel filling gun 12.

A flow guide 20 for guiding a flow of fuel supplied from the nozzle part 12a of the fuel filling gun 12 is attached to a fuel introduction region 19 in a vicinity of the fuel fill opening 13 inside the fuel filler pipe 11. Further, reference sign 21 in FIG. 2 denotes a vapor return tube for causing air in the tank main body 10 (air containing evaporated fuel) to flow into an upper portion of the fuel filler pipe 11 at the time of refueling.

Figure 3:
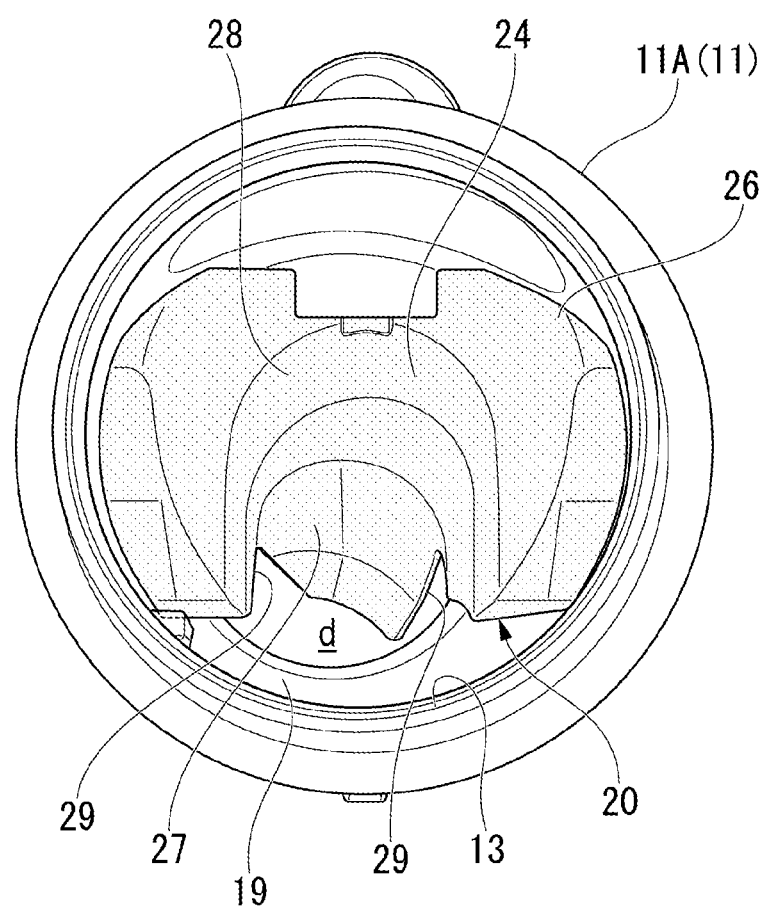
FIG. 3 is a view of a portion of the fuel fill opening structure according to one embodiment of the present invention when viewed from the fuel fill opening side.
Figure 4:
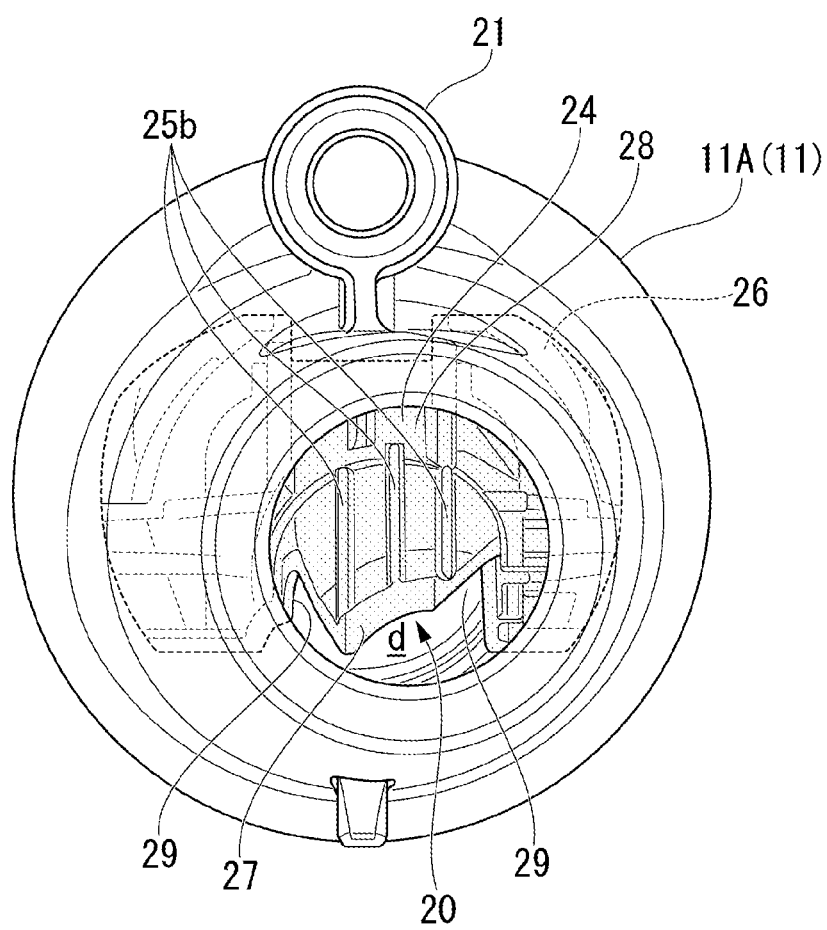
FIG. 4 is a view of a portion of the fuel fill opening structure according to one embodiment of the present invention when viewed from a side opposite to the fuel fill opening.
Figure 5:
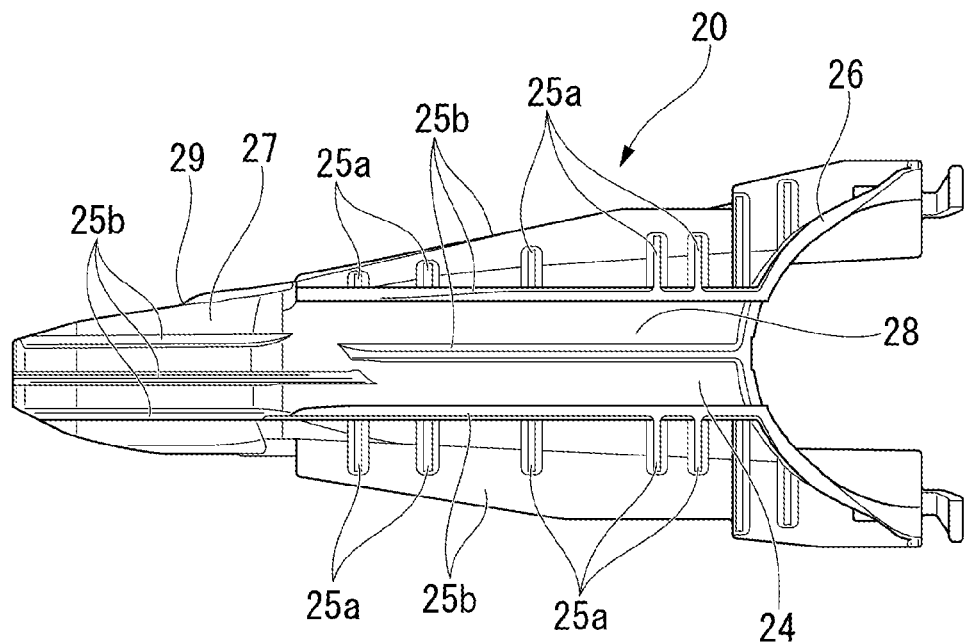
FIG. 5 is a top view of a flow guide according to one embodiment of the present invention.
Figure 6:
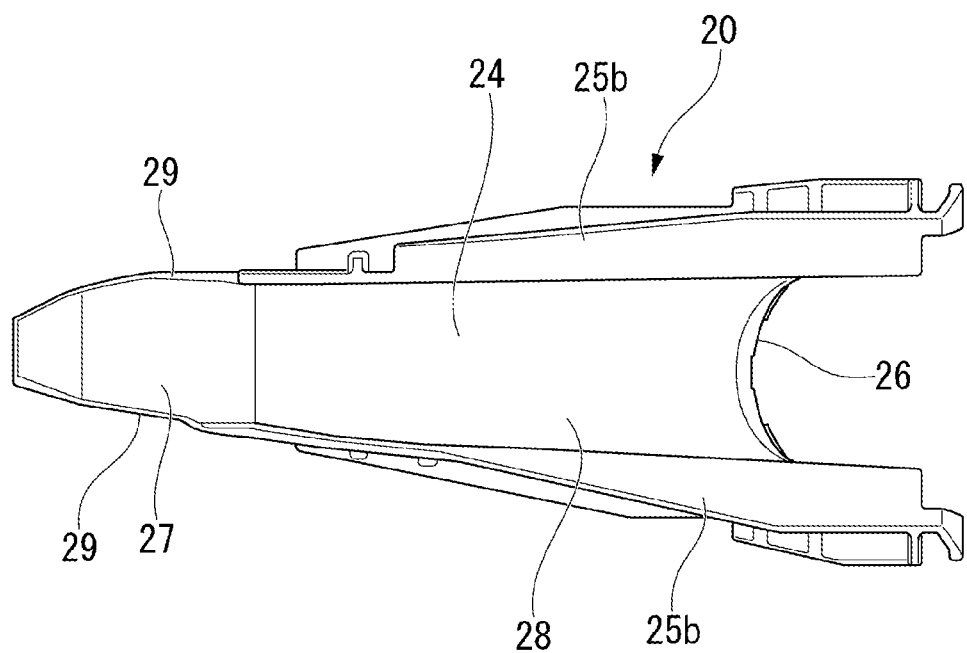
FIG. 6 is a bottom view of the flow guide according to one embodiment of the present invention.
Figure 7:
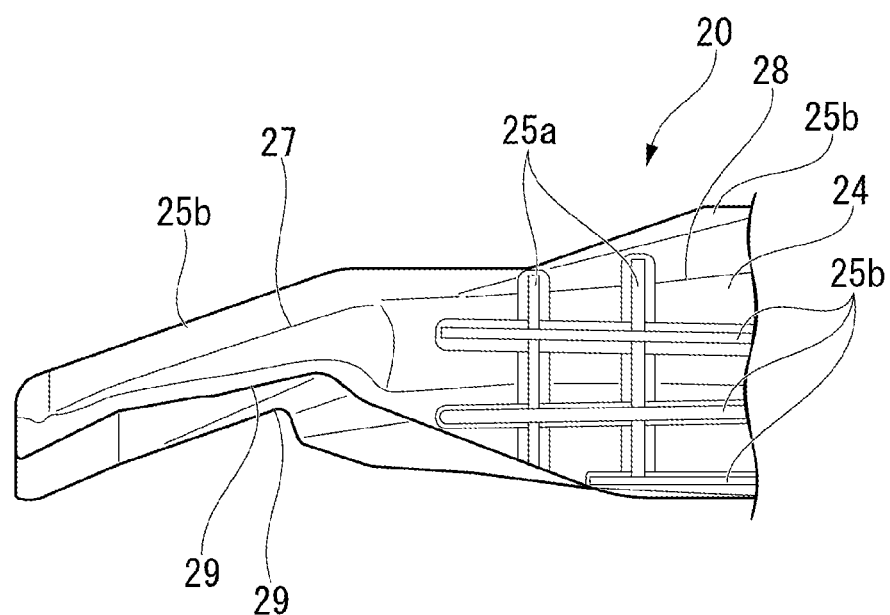
FIG. 7 is a side view of a portion of the flow guide according to one embodiment of the present invention.

FIG. 3 is a view of the fuel filler pipe 11 when viewed from the fuel fill opening 13 side with members such as the shutter valve 16, the posture holding member 17, and the on-off valve 18 removed, and FIG. 4 is a view of the inlet side extended part 11A when viewed form a side opposite to the fuel fill opening 13 with the inlet side extended part 11A of the fuel filler pipe 11 disassembled. A portion of the flow guide 20 can be seen inside the fuel filler pipe 11 in each of these drawings. FIG. 5 is a top view of the flow guide 20, and FIG. 6 is a bottom view of the flow guide 20. Also, FIG. 7 is a left side view of a portion of the flow guide 20.

As illustrated in FIG. 2, the flow guide 20 is attached to the fuel introduction region 19 inside the fuel filler pipe 11. The flow guide 20 includes a main guide wall 24 which partitions the fuel introduction region 19 inside the fuel filler pipe 11 into an upper space 22 communicating with the tank main body 10 side and a lower space 23 communicating with the fuel fill opening 13 side. The main guide wall 24 is formed in substantially a trapezoidal shape in which a width on one end side in a longitudinal direction is large and a width on the other end side is small in a top view and a bottom view. The flow guide 20 is attached inside the fuel filler pipe 11 so that a longitudinal direction of the main guide wall 24 is substantially in an axial direction of the fuel filler pipe 11. A cross section perpendicular to the longitudinal direction of the main guide wall 24 is formed in substantially a U shape that is open downward. However, a plurality of ribs 25a and 25b for reinforcement are formed on an upper surface side of the main guide wall 24 as appropriate, and a cross section of a portion excluding these ribs 25a and 25b is formed in substantially a U shape.

A partition wall 26 extending substantially radially from the upper surface side of the main guide wall 24 upward and to the left and right sides is provided at an end portion (hereinafter referred to as a "base end portion") of the main guide wall 24 on a side whose width is wide in the longitudinal direction. The partition wall 26 is locked and fixed to an inner surface of the fuel introduction region 19 in the inlet side extended part 11A of the fuel filler pipe 11 by an appropriate means such as concavo-convex engagement. The partition wall 26 closes a space between the upper surface side of the main guide wall 24 and an inner surface of the fuel filler pipe 11, thereby blocking a flow of evaporated fuel from the upper space 22 to the lower space 23 through an upper portion of the base end portion of the main guide wall 24.

The main guide wall 24 includes a bent inclined part 27 that is bent and inclined downward from a middle portion in running from the base end portion side (fuel fill opening 13 side) toward a distal end portion side (tank main body 10 side). Here, when a portion closer to the base end portion with respect to the bent inclined part 27 of the main guide wall 24 is referred to as a general part 28, a cross section perpendicular to a longitudinal direction of the general part 28 gradually changes to a smaller cross section toward the distal end portion side. On the other hand, a cross section perpendicular to a longitudinal direction of the bent inclined part 27 abruptly changes to a smaller cross section toward the distal end portion side as compared to the general part 28.

Also, the main guide wall 24 is formed to have a shape that causes a flow of fuel supplied from the nozzle part 12a of the fuel filling gun 12 to swirl spirally along the inner surface of the fuel filler pipe 11. Specifically, an inner surface of the main guide wall 24 is shaped to be inclined downward and to the left or right with respect to an axis of the fuel filler pipe 11.

As illustrated in FIG. 2, a portion around the distal end portion of the bent inclined part 27 has a gap d formed between it and the inner surface of the fuel filler pipe 11 in a state in which the flow guide 20 is attached inside the fuel filler pipe 11, and the gap d forms a portion of a fuel flow port. As illustrated in FIG. 5, the bent inclined part 27 of the main guide wall 24 has a shape in which a width thereof becomes smaller when viewed from above as it inclines downward. Particularly, a width in a vicinity of the distal end portion of the bent inclined part 27 abruptly becomes smaller when viewed from above. When the width of the bent inclined part 27 becomes smaller when viewed from above, the gap d between the bent inclined part 27 and the inner surface of the fuel filler pipe 11 is expanded.

Also, the bent inclined part 27 of the main guide wall 24 includes a notch-shaped recessed part 29 serving as a communication part formed on left and right side portions in an extending direction. The recessed part 29 forms a portion of the fuel flow port between the recessed part 29 and the inner surface of the fuel filler pipe 11.

Accordingly, in the case of the present embodiment, the fuel flow port through which fuel passes at the time of refueling is formed by the gap d and the left and right recessed parts 29 of the bent inclined part 27.

Further, in the present embodiment, the recessed part 29 is formed on the left and right side portions of the bent inclined part 27, but the recessed part 29 may be formed on only one of the left and right side portions of the bent inclined part 27.

Also, a shape of the recessed part 29 is not limited to a notch shape and is arbitrary.

Also, as illustrated in FIG. 2, the main guide wall 24 including the bent inclined part 27 is configured such that an intersection point P between a virtual line L passing through an extension end of the bent inclined part 27 and following a flow direction of fuel at the extension end, and the inner surface of the fuel filler pipe 11 is positioned on the fuel fill opening 13 side with respect to the pipe bent part 11B of the fuel filler pipe 11.

In the above-described configuration, when refueling the tank main body 10 of the fuel tank 1 is actually performed, as illustrated in FIGS. 1 and 2, the nozzle part 12a of the fuel filling gun 12 is inserted into the fuel fill opening 13 and refueling using the fuel filling gun 12 is started in this state. At this time, when the nozzle part 12a is inserted into the fuel fill opening 13, the shutter valve 16 and the on-off valve 18 are pushed open, and a distal end portion of the nozzle part 12a is positioned in the fuel introduction region 19 of the fuel filler pipe 11. Also, the nozzle part 12a is guided by the posture holding member 17, and the distal end portion is positioned on an inward side below the main guide wall 24 of the flow guide 20.

When refueling using the fuel filling gun 12 is started in this state, the fuel that has flowed in from the nozzle part 12a is guided by the main guide wall 24 of the flow guide 20 and proceeds to the bent inclined part 27 side, and flows out to the tank main body 10 side of the fuel filler pipe 11 through the gap d around the bent inclined part 27 and the left and right recessed parts 29. At this time, the fuel is guided to the inner surface of the main guide wall 24 including the bent inclined part 27 and forms a swirling flow along the inner surface of the fuel filler pipe 11. As a result, as illustrated by dotted arrows in FIG. 1, the fuel passes through the inlet side extended part 11A, the pipe bent part 11B, and the base side extended part 11C of the fuel filler pipe 11 in sequence and flows into the tank main body 10 while swirling spirally.

Also, when refueling the tank main body 10 is performed through the flow guide 20 in this way, evaporated fuel generated inside the fuel filler pipe 11 of the tank main body 10 moves upward inside the fuel filler pipe 11. The evaporated fuel that has moved upward inside the fuel filler pipe 11 moves to an upper side (the upper space 22) of the main guide wall 24 along an outer surface of the bent inclined part 27 of the main guide wall 24 of the flow guide 20.

At this time, since a space between the base end portion of the main guide wall 24 and the inner surface of the fuel filler pipe 11 is closed by the partition wall 26 of the flow guide 20, the evaporated fuel is prevented from flowing out from the upper space 22 to the fuel fill opening 13 side.

As described above, in the fuel fill opening structure 15 according to the present embodiment, the space between the upper surface side of the main guide wall 24 of the flow guide 20 and the inner surface of the fuel filler pipe 11 is closed by the partition wall 26, and the bent inclined part 27 is provided in the main guide wall 24. Therefore, an outflow of the evaporated fuel to the outside through the fuel fill opening 13 at the time of refueling can be inhibited by cooperation of the bent inclined part 27 of the flow guide 20 and the partition wall 26.

Further, in the case of the fuel fill opening structure 15 according to the present embodiment, the bent inclined part 27 has a shape in which the width becomes smaller when viewed from above as it inclines downward. Therefore, the gap d between the bent inclined part 27 and the inner surface of the fuel filler pipe 11 can be largely secured, and the fuel can be caused to smoothly flow into the tank main body 10 side.

Therefore, when the fuel fill opening structure 15 according to the present embodiment is employed, both inhibiting an outflow of the evaporated fuel to the outside and improving a refueling performance at the time of refueling can be achieved.

Also, since the fuel fill opening structure 15 according to the present embodiment includes the recessed parts 29 serving as a communication part provided at the side portions of the bent inclined part 27 of the flow guide 20, a large fuel flow port between the bent inclined part 27 and the inner surface of the fuel filler pipe 11 can be secured, and the fuel can be caused to flow to the tank main body 10 side more smoothly through the fuel flow port.

Also, the fuel fill opening structure 15 according to the present embodiment is formed so that the main guide wall 24 of the flow guide 20 has a shape that causes a flow of fuel supplied from the fuel filling gun 12 to swirl spirally along the inner surface of the fuel filler pipe 11. Therefore, at the time of refueling, the fueled fuel flows to the tank main body side while spirally swirling along the inner surface of the fuel filler pipe. Accordingly, when the fuel fill opening structure 15 of the present embodiment is employed, since the fuel does not readily scatter in the fuel filler pipe 11 at the time of refueling, evaporation of the fuel at the time of refueling can be inhibited.

Further, as illustrated in FIG. 2, the fuel fill opening structure 15 according to the present embodiment includes the main guide wall 24 of the flow guide 20 that is configured so that the intersection point P between the virtual line L passing through the extension end of the bent inclined part 27 and following a flow direction of the fuel at the extension end, and the inner surface of the fuel filler pipe 11 is positioned on the fuel fill opening 13 side with respect to the pipe bent part 11B of the fuel filler pipe 11. Therefore, the fuel that has passed through the bent inclined part 27 of the flow guide 20 at the time of refueling starts swirling along the inner surface of the inlet side extended part 11A before the fuel reaches the pipe bent part 11B of the fuel filler pipe 11. Accordingly, when the fuel reaches the pipe bent part 11B of the fuel filler pipe 11, the fuel changes its direction toward the base side extended part 11C without abruptly colliding with the inner surface of the pipe bent part 11B. Therefore, when the fuel fill opening structure 15 according to the present embodiment is employed, generation of evaporated fuel in the fuel filler pipe 11 can be further inhibited.

Further, the present invention is not limited to the embodiment described above, and various modifications can be made in design in a scope without departing from the gist of the present invention. For example, in the above-described embodiment, the communication part has been configured by the recessed part 29 formed at the side portion of the bent inclined part 27 of the flow guide 20, but the communication part is not limited to the recessed part 29 and may be a hole vertically penetrating through the bent inclined part 27. Also, a communication part such as the recessed part or the hole may not be necessarily provided in the bent inclined part 27 as long as the bent inclined part 27 has a shape in which a width thereof becomes smaller when viewed from above as it inclines downward.

REFERENCE SIGNS LIST

1 Fuel tank
10 Tank main body
11 Fuel filler pipe
11A Inlet side extended part
11B Pipe bent part
12 Fuel filling gun
12a Nozzle part
13 Fuel fill opening
15 Fuel fill opening structure
19 Fuel introduction region
20 Flow guide
22 Upper space
23 Lower space
24 Main guide wall
26 Partition wall
27 Bent inclined part
29 Recessed part (communication part)
L Virtual line
P Intersection point

What is claim is:

1. A fuel fill opening structure for a fuel tank comprising:
    a fuel filler pipe which extends from a tank main body of a fuel tank;
    a fuel fill opening which is provided at an extension end of the fuel filler pipe and into which a nozzle part of a fuel filling gun is able to be inserted; and
    a flow guide provided in a fuel introduction region in a vicinity of the fuel fill opening inside the fuel filler pipe and configured to guide a flow of fuel supplied from the fuel filling gun, wherein the flow guide is formed in substantially a U shape, and wherein the flow guide includes:
        a main guide wall which partitions the fuel introduction region inside the fuel filler pipe into an upper space communicating with the tank main body side and a lower space communicating with the fuel fill opening side; and
        a partition wall provided to be continuous with the main guide wall and configured to close a space between an upper surface side of the main guide wall and an inner surface of the fuel filler pipe, the main guide wall includes a bent inclined part that is bent and inclined downward from a middle portion in running from the fuel fill opening side toward the tank main body side, and the bent inclined part has a shape in which a width thereof becomes smaller when viewed from above as it inclines downward and forms a flow port for the fuel.

2. The fuel fill opening structure for a fuel tank according to claim 1, wherein a communication part expanding the flow port is further provided in the bent inclined part.

3. The fuel fill opening structure for a fuel tank according to claim 1 or 2, wherein the main guide wall is formed in a shape that causes a flow of fuel supplied from the fuel filling gun to swirl along the inner surface of the fuel filler pipe.

4. The fuel fill opening structure for a fuel tank according to claim 3, wherein the fuel filler pipe includes:
    an inlet side extended part which extends to be inclined obliquely downward from the fuel fill opening, and a pipe bent part which is bent downward from the inlet side extended part toward the tank main body side, and wherein the main guide wall is configured so that an intersection point between a virtual line passing through an extension end of the bent inclined part and following a flow direction of fuel at the extension end, and the inner surface of the fuel filler pipe is positioned on the fuel fill opening side with respect to the pipe bent part.

* * * * *